INVENTOR
JAMES HARRISON
BY
Frederick C. Bromley
ATTORNEY

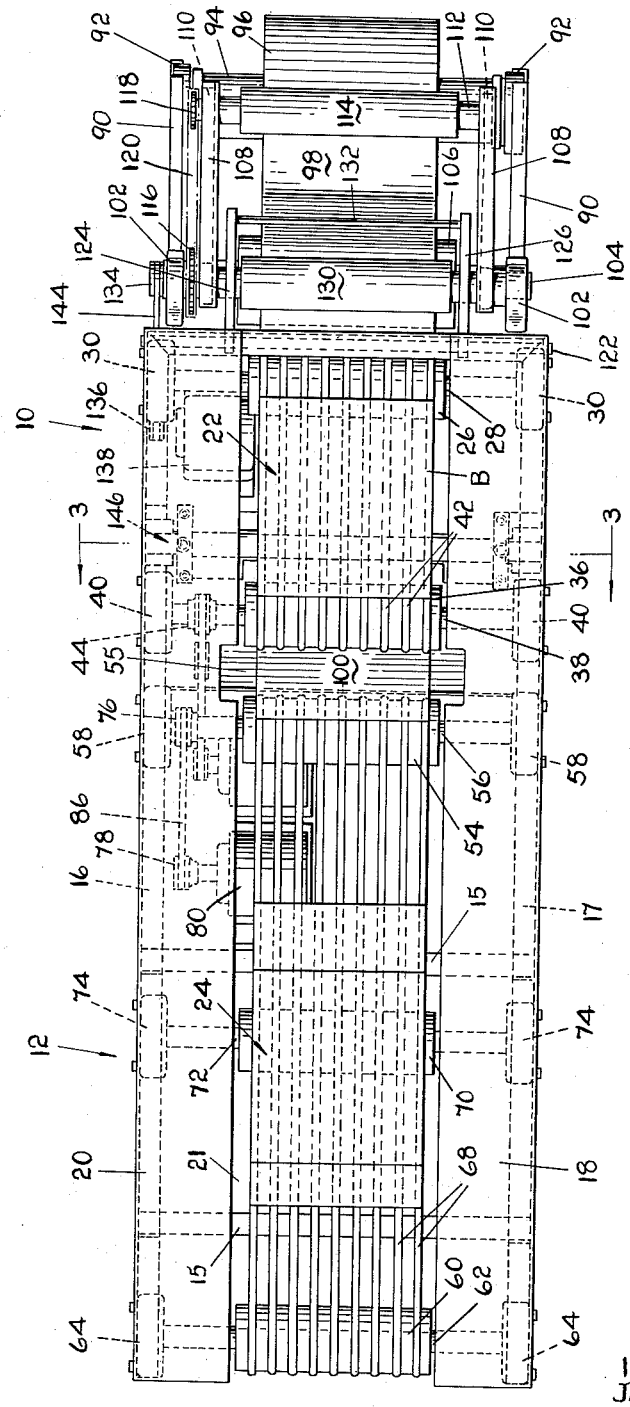

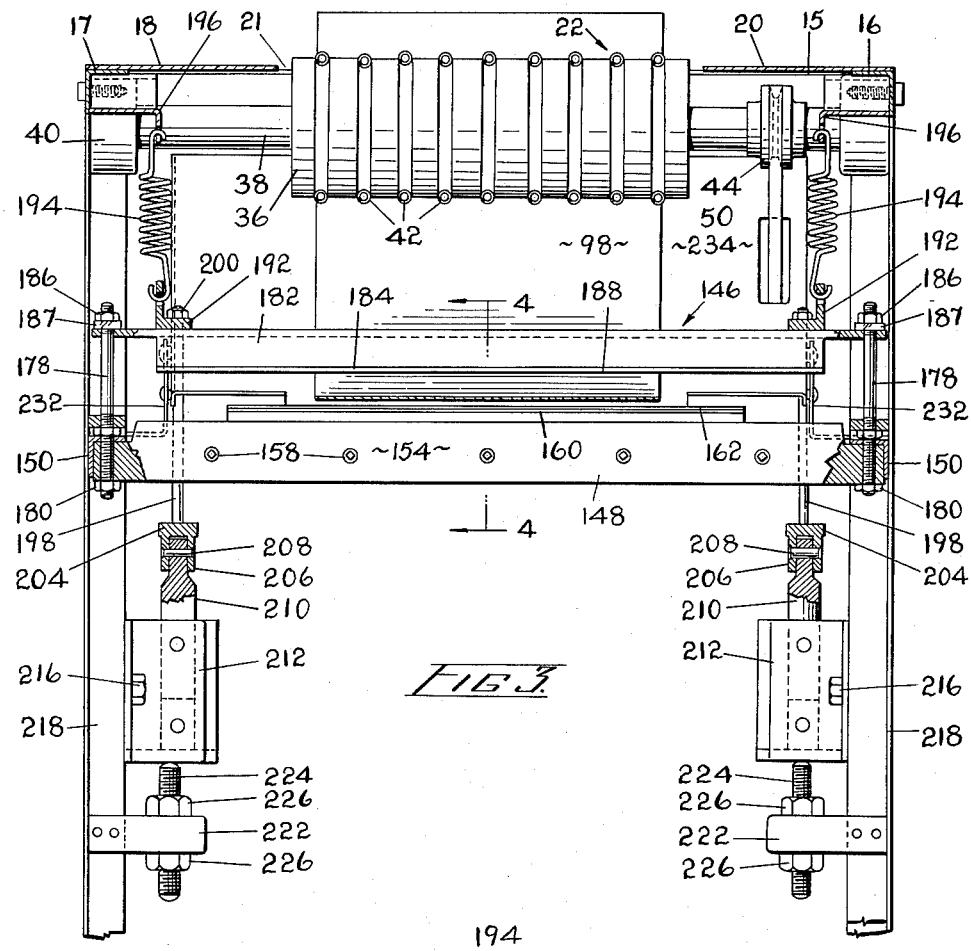
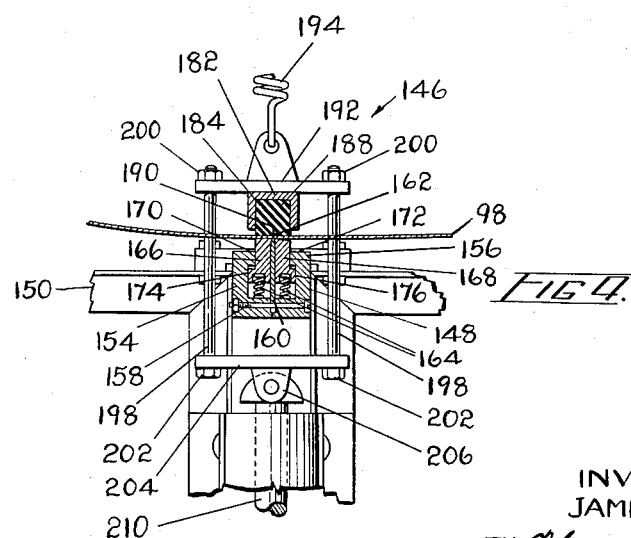

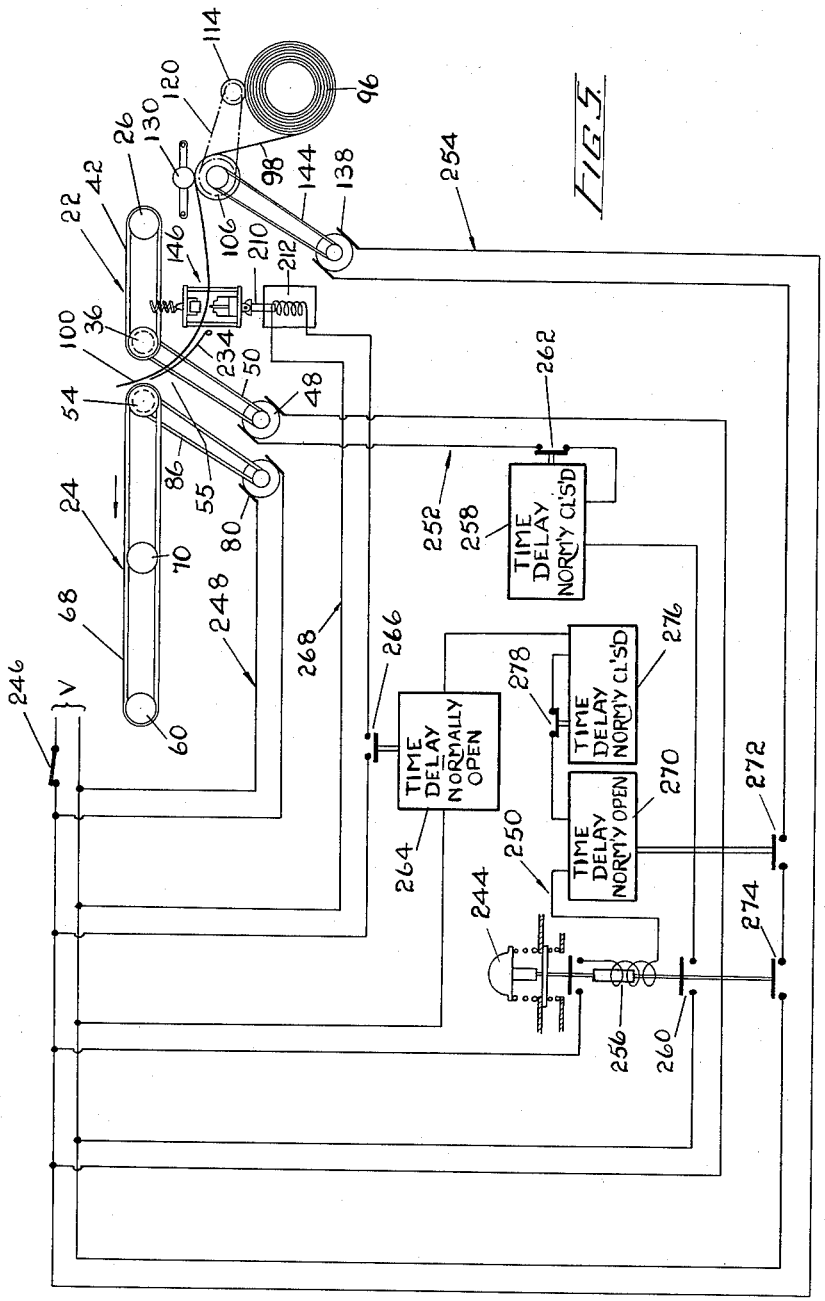

United States Patent Office 3,001,352
Patented Sept. 26, 1961

3,001,352
APPARATUS FOR POSITIONING AN UNDERWRAP SHEET BENEATH MATERIAL TO BE WRAPPED
James Harrison, Thornhill, Ontario, Canada, assignor to The Globe and Mail Limited, Toronto, Ontario, Canada, a corporation of Ontario
Filed Sept. 16, 1959, Ser. No. 840,279
4 Claims. (Cl. 53—389)

This invention relates generally to the wrapping of material and more particularly to the positioning of an underwrap sheet beneath such material. The apparatus and method is especially adaptable for use in wrapping bundles of newspapers or the like and as will be apparent can be used wherever an underwrap sheet is to be used. When used for wrapping bundles of newspapers, for example, an overwrap sheet will be applied subsequent to tying the bundles.

In the use mentioned above, where the delivery of numerous bundles of newspapers to outlying areas is necessary, it is important that the bundles be wrapped as expeditiously and rapidly as possible after the papers leave the presses.

A primary object of the invention is to provide a novel method and apparatus for substantially automatically positioning an underwrap sheet beneath material to be wrapped.

A further object of the invention is to provide a novel method whereby the material to be wrapped functions with the underwrap sheet as it is being conveyed from one station to a next and to position an underwrap sheet for disposition beneath additional material.

Another object of the invention is to provide apparatus whereby material to be wrapped is conveyed in timed sequence to a periodically severed underwrap sheet obtained from a power driven endless web of wrapping material.

A more particular object of invention is to provide apparatus including spaced conveying means defining the path of travel of material to have an underwrap sheet disposed therebeneath and including means to periodically sever an underwrap sheet from a power driven continuous web and position the sheet in the path through which the material is being conveyed whereby the sheet is positioned beneath the material during its travel from the spaced conveying means.

Other objects and advantages of the invention will become apparent during the course of the following description. In the drawings there is shown one preferred embodiment of the invention. In this showing:

FIGURE 2 is a top plan view of the apparatus of FIGURE 1;

FIGURE 3 is a transverse, enlarged, fragmentary section taken substantially on line 3—3 of FIGURE 2, with portions broken away for purposes of clarity;

FIGURE 4 is a section taken substantially on line 4—4 of FIGURE 3 showing details of the cutter means of the apparatus; and FIGURE 5 is a diagrammatic view showing a wiring diagram in relation to the novel apparatus to obtain the timed sequence of the cooperating portions thereof.

Figure 1:
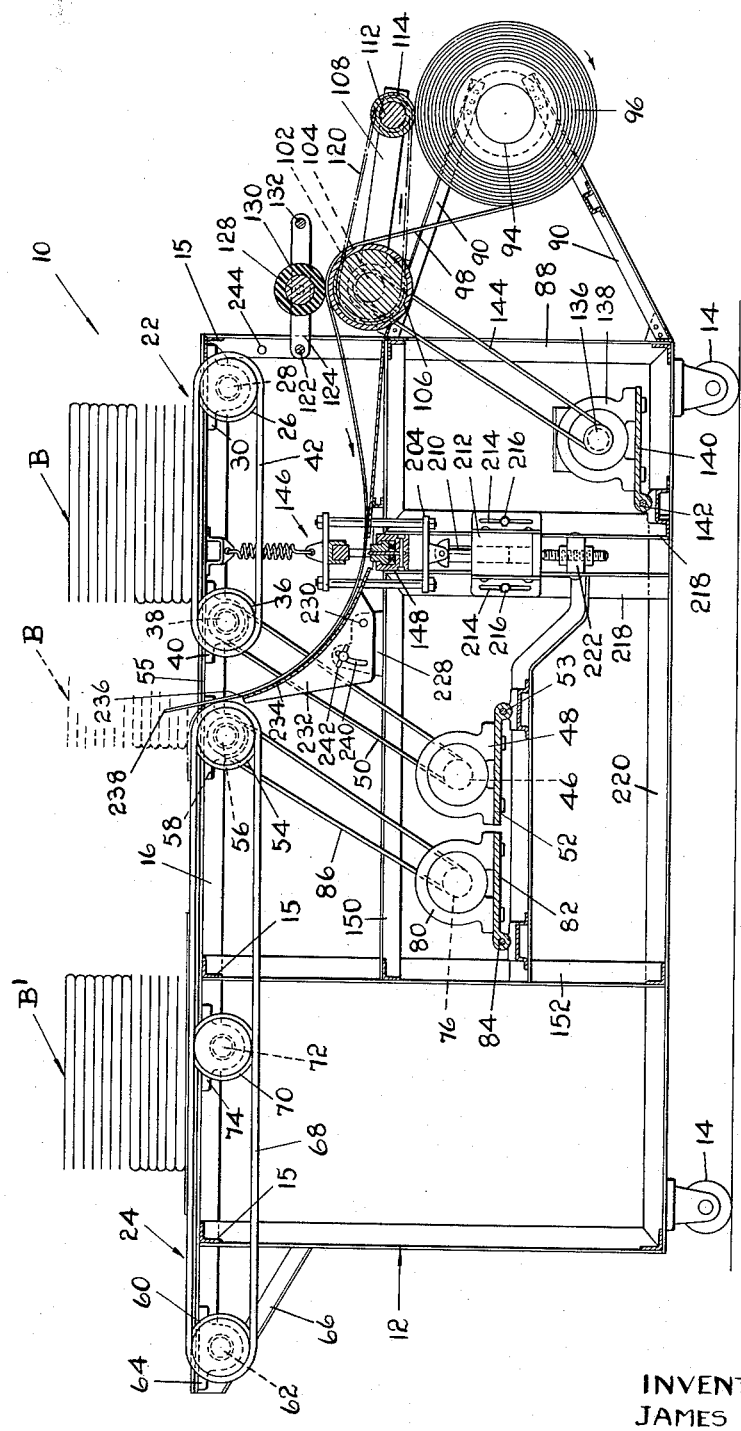
FIGURE 1 is a side elevation of the novel apparatus, illustrating the novel method, with portions shown in section for the purpose of clarity.

Referring to the drawings in detail, the novel apparatus is indicated generally at 10 and includes a substantially rectangular skeletonized support frame 12 constructed from suitable angle members or the like. In order to render the apparatus readily mobile, suitable caster wheel assemblies 14 are secured to the lower corners of the frame 12.

The frame 12 has supported on transverse angle members 15 extending between side frame members 16 and 17, suitable side aprons 18 and 20 between which is provided an elongated longitudinally extending passage or open well 21 which has disposed therein in spaced longitudinally extending relation a first endless conveyor indicated generally at 22 and a second endless conveyor indicated generally at 24. The first and second conveyors may be conventionally described as first and second stations, respectively, for a bundle of newspapers B or the like which will be moved along a predetermined path of travel therebetween.

The conveyor 22 includes a rear cylindrical roller 26 carried on a transverse shaft 28 journalled at opposite ends in bearings 30 depending in spaced aligned relationship from opposite sides of the side frame members 16 and 17 of the frame 12. The conveyor 22 also includes a front cylindrical roller 36 which is carried on a shaft 38 journalled at opposite ends in aligned bearings 40 depending from an intermediate portion of the side frame members 16 and 17. The rollers have entrained thereover a plurality of transversely spaced endless belts 42 which may comprise conventional helically wound wires, the upper run of the belts being substantially coplanar with the aprons 18 and 20 as seen in FIGURES 1 and 3. The shaft 38 has a V-pulley 44 secured thereto in alignment with a drive pulley 46 on the drive shaft of an electric motor 48, and a drive belt 50 is entrained over the pulleys 44 and 46. The motor 48 is mounted on a suitable horizontally pivotal support plate 52 mounted at 53 on the frame 12.

The second conveyor 24 includes a rear cylindrical roller 54 carried on a transverse shaft 56 journalled in spaced aligned bearings 58 depending from the frame members 15 and 16, and a front cylindrical roller 60 is mounted on a transverse shaft 62 journaled at opposite ends in aligned bearings 64 depending from the side frame members 15 and 16 and braced as indicated at 66. The rear roller 54 is in spaced relation from the front roller 36 of the conveyor 22 as seen in FIGURES 1 and 2 and indicated at 55 for a purpose to subsequently become apparent. The rollers 54 and 56 have entrained thereover transversely spaced endless belts 68 which may be helically wound wires similar to belts 42. The upper run of the belts 68 are also substantially coplanar with the aprons 18 and 20 and the upper runs of belts 42. Due to the length of the belts 68 an intermediate cylindrical, transverse support roller 70 is mounted on a shaft 72 having its ends journaled in aligned bearings 74 depending from the frame members 15 and 16. The shaft 56 has secured to an intermediate portion thereof a V-pulley 76 in alignment with a drive pulley 78 on the drive shaft of an electric motor 80 mounted on a support plate 82 pivotally mounted at 84 on the frame 12. A drive belt 86 is entrained over the pulleys 76 and 78. The weight of the motors 48 and 80 on their respective support plates will cause the belts 50 and 86 to be tight in driving relationship with their respective pulleys.

Projecting rearwardly from the vertical frame members 88 (only one shown in FIGURE 1) at opposite sides of the frame 12 are converging support members 90 which support aligned bearings 92 in which are journaled opposite ends of a support spindle 94 of a replaceable convoluted roll 96 of wrapping paper or the like. The roll 96 provides a continuous web 98 which will be power driven and severed in predetermined lengths to form an underwrap sheet 100 to be disposed beneath the bundle as will be presently described in detail.

Journaled in suitable aligned bearings 102, carried on an upper portion of the support members 90 adjacent the frame members 88 is a support shaft 104 of a cylindrical web-feed roller 106 of rubber, steel or the like, over which the web 98 is entrained; see FIGURE 1. The web 98 of wrapping material generally does not have sufficient tensile strength and thus means is provided to power rotate the convoluted roll 96 in synchronized relation with the web-feed roller 106. Pivotally mounted in spaced relation on the shaft 104 is a pair of support arms 108 which carry in their terminal ends aligned bearing 110 in which is journaled ends of a support shaft 112 of a rubber surfaced, cylindrical, roll-drive roller 114 which tangentially engages the upper surface of the convoluted roll 96. The shaft 104 has secured thereon a sprocket wheel 116 in alignment with a sprocket wheel 118 fixed to the end of shaft 112 of the roller 114 and an endless drive chain 120 is entrained over the sprocket wheels. Pivotally mounted on a transverse support shaft 122 carried by the frame members 88 above the roller 106 is a pair of spaced support arms 124 and 126 which carry a transverse support shaft 128 upon which is journaled a rubber idler roller 130 which tangentially engages the upper surface of the web 98 as it passes over the roller 106. The arms 124 and 126 have extending transversely between their terminal ends a rod 132 providing additional weight to cause the roll 130 to be biased by gravity into engagement with the web.

The shaft 104 includes a pulley 134 on one end, see FIGURE 2, in alignment with a pulley 136 on the drive shaft of a motor 138 mounted on a horizontally pivotal support plate 140 carried on the frame 12 as indicated at 142. A drive belt 144 is entrained over the pulleys 134 and 136 and is tensioned by the weight of the motor 138 on the support plate 140. It will be observed that the positively driven rollers 106 and 114 insure movement of the web 98 off the roll 96 and the roller 130 insures movement of the web toward a guillotine cutter assembly indicated generally at 146, see FIGURES 1, 3 and 4.

The cutter assembly 146 includes a fixed blade assembly 148 extending transversely and horizontally between longitudinally extending, intermediate frame members 150 which are secured at opposite ends to intermediate portions of the vertical frame members 88 and vertical frame members 152 (only one shown). The blade assembly 148 includes two elongated mating portions 154 and 156 retained together by means of transverse bolts 158. The bolts 158 also extend through an elongated blade 160 which includes an upwardly disposed cutting edge 162. Upwardly biased by compression springs 164 is a pair of elongated jaws 166 and 168 which normally extend on opposite sides of the blade 160 to enclose the cutting edge 162. The mating portions 154 and 156 include inwardly turned flanges 170 and 172, respectively, which engage outwardly turned flange portions 174 and 176 on the jaws 166 and 168, respectively, to limit upward movement of the jaws. Thus the cutting edge is normally within the downwardly displaceable jaws transversely beneath the web 98 as clearly seen in FIGURE 4. Opposite ends of the portions 154 and 156 are secured to the frame members 152 by elongated bolts 178 and spaced nuts 180. The bolts 178 extend vertically above the frame members 152 and reciprocably receive thereon apertured end portions of an elongated inverted U-shaped casing 182 of a bumper 184. The casing is retained on the bolts 178 by means of nuts 186 and a resilient washer or bumper element 187 is interposed between the nuts and the casing ends. The casing has secured therein an elongated bumper element 188 of rubber or any suitable material which includes a downwardly opening groove 190 which is in alignment with the cutter blade 160 and receives the cutter edge 162 therein when the bumper 184 is displaced downward in a cutting stroke to displace the jaws 166 and 168 to sever the web. The casing has secured transversely of opposite upper ends mounting plates 192 which include a vertically disposed apertured eye portion in which is disposed the lower hook-end portion of a tension spring 194. The upper hook-ends of the springs are secured in depending apertured support bracket 196. The springs normally bias the bumper 184 vertically above the cutter blade 160. A pair of spaced rods 198 depend from the plates 192 being retained thereto by means of nuts 200. Secured to the rods 198 by means of nuts 202 are plates 204 including a bifurcated apertured eye portion 206. Secured to the eye portions 206 by a pin 208 are armature cores 210 of a solenoid coil 212. The coil 212 includes a housing having vertically extending slots 214 receiving bolts 216 therethrough which are received in a pair of spaced vertical support elements 218 extending between the lower side frame members 220 of the frame 12 (only one shown) and the frame members 150. An inwardly projecting bracket 222 is supported on the elements 218 and supports a vertically adjustable abutment screw 224 retained in an adjusted position by nuts 226. Energization of the solenoid coils 212 will result in downward movement of the bumper 184 to overcome the tension springs 194 and cause the web 98 to be severed in an underwrap sheet 100.

The frame members 150 include opposed brackets 228 which pivotally support at 230 flanged sides 232 of a convex guide plate 234 which extends transversely from the cutter assembly 146 upwardly and terminates in an upper guide edge 236 adjacent the roller 54 of the conveyor 24. The guide plate 234 will be effective to engage the leading edge 238 of the web 98, prior to the sheet 100 being severed, and direct the same vertically into the space 55 between the conveyors 22 and 24 for engagement by the bundle B as it moves from conveyor 22 to 24. The flanged sides 232 of the guide plate 234 include arcuate slots 240 concentric to the pivot 230 and receive wing bolts 242 therethrough, the wing bolts being received in suitably apertured portions of the brackets 228. The pivotal adjustment of the guide plate facilitates adjustment of the leading edge of the plate relative to the rear end of the conveyor 24 to insure engagement of the underwrap sheet on the conveyor belts 68 which are constantly rotated.

During operation of the apparatus, the conveyor 24 is constantly operated, and the conveyor 22, guillotine cutter assembly 146 and power driven convoluted roll 96 are operated in timed sequence of afford cutting of the underwrap sheet prior to engagement thereof by the bundle B as it moves from the conveyor 22 to 24.

A control switch 244 is conveniently located on the frame member 88, see FIGURES 1 and 5 and as will subsequently be described in detail relative to FIGURE 5, depression of the switch 244 will cause the motor 48 to be energized to move the bundle B on conveyor 22 toward conveyor 24 and through the position shown by phantom lines in FIGURE 1. The bundle B during the movement will sweep the terminal end of a severed sheet 100 onto the belts 68 of the conveyor to be drawn along and beneath the bundle. A short time after the bundle B starts to move, the blade assembly solenoid coils will be energized to operate the blade assembly 146 as previously mentioned to sever the sheet from the continuous web 98. After a predetermined time delay of about 1/25 of a second the blade activating coils 212 will be de-energized, releasing the pad 188 from the blade 160. At approximately the same time, the motor 138 will be activated whereby the web 98 will be fed toward the guide plate 234 until the leading edge of the web reaches the position shown in FIGURE 1, after which the motor 138 will be de-energized along with the rest of the system, except the motor 80 which is in constant operation.

A simplified schematic wiring diagram is shown in FIGURE 5, with fuses, switch boxes and other conventional structure being omitted from the drawing. Any conventional electrical timing device may be used in the circuit, for example, those of the type called "Agastats." These devices are shown in squares marked "time delay" on the drawing. The time delay "Agastats," not shown in detail, comprise a spring-biased armature including a piston in a cylinder, the movement of which being controlled by a bleed aperture. Contacts are arranged on the armature to open or close a circuit.

Referring to FIGURE 5, a master switch 146 is closed to energize the circuit. This causes the motor 80 to be energized through the circuit 248 to cause the conveyor 24 to be rotated in the direction indicated. Depression of the control switch 244 will start the sequence of operations previously mentioned by closing a control circuit 250, a conveyor circuit 252 for the motor 48 of the conveyor 22, and a circuit 254 for energizing the motor 138 which operates the power driven roll of wrapping paper 96.

Immediately as the switch 244 is closed, the circuit 250 is closed and solenoid 256 is energized. At the same time circuit 250 is closed, circuit 252 for the first conveyor is closed to move the bundle B toward the conveyor 24. After a predetermined period, a time delay control 258 energized by the closing of contacts 260 of the switch 244, will cause the closed contacts 262 to open to cause de-energization of the circuit 252. Immediately before or about the same time as the leading edge of the bundle B reaches the leading edge 238 of the web, a time delay switch 264, which has normally open contacts 266 will function to energize a circuit 268 to the blade energizing coils 212 to sever the sheet 100. After a short dwell, approximately 1/25 of a second, the time delay switch 264 will function to reopen the contacts 266 and open the circuit 268. At approximately the same time, or immediately after the circuit 268 is reopened, a time delay switch 270 having normally open contacts 272 will operate to close the contacts 272 to energize the circuit 254 to cause the motor 138 to operate to feed the web 98 over the blade assembly 146 and along the guide plate 234 to the open space 55 between the conveyors. The switch 244 which was previously actuated will have functioned to close a second set of contacts 274 to permit energization of the circuit 254. After a predetermined interval sufficient to permit the web 98 to be fed into its proper position, a time delay switch 276 including normally closed contacts 278, will function to open the contacts 278 and de-energize the circuit 250 resulting in the deenergizing of solenoid 256 which will cause the circuit 254 to be de-energized to stop the motor 138. At this time all the circuits, except circuit 248 to motor 80 will be de-energized, and after a new bundle B has been disposed on conveyor 22 the switch 244 will once more be closed for the initiation of the next sequential operation of the cooperating components of the apparatus.

The bundle indicated at B' will have the underwrap sheet 100 properly disposed therebeneath preparatory to having an overwrap sheet disposed on the bundle and permit tying of the bundle.

The construction shown and the method described embodies the invention in its preferred form, however, it is intended that the foregoing disclosure be illustrative rather than definitive, the invention being described in the appended claims.

What is claimed as new is as follows:

1. Apparatus for positioning an underwrap-sheet beneath material to be wrapped comprising horizontally disposed conveying means for transporting material to be wrapped along a predetermined path of travel from one station to another, means for supporting a continuous web of wrapping material, web dispensing means for dispensing the continuous web of wrapping material from beneath said conveying means into transverse intersecting relation with respect to the path of travel of said conveying means, cutting means parallel to said web dispensing means to sever uniform lengths of said wrapping material, power means connected to said conveying means, means for operating said web dispensing and cutting means, sequence-timing means connected to and automatically operating said power means to operate said conveying, web dispensing and cutting means in timed sequence, said conveying means comprising a pair of independently driven endless conveyors disposed in longitudinally spaced end-to-end relation with upper runs in substantially coplanar relation, and guide means interposed between said cutting means and said path of travel of said conveying means and directed toward adjacent ends of said two endless conveyors, said guide means comprising an arcuate plate mounted on a horizontal axis of rotation and having one end adjacent said cutting means for receiving a severed sheet of wrapping material thereon, said plate curving upwardly from said cutting means and terminating in an upper edge movable longitudinally between the adjacent ends of said spaced conveyors and below said substantially co-planar conveyor runs, said guide plate including means for lockingly retaining said plate in an adjusted position for orienting the leading end of the uniform lengths of wrapping material at different elevations with respect to the upper runs of said endless conveyors.

2. The structure of claim 1; said guide plate including depending flanged sides, a bracket on said apparatus received between said flanged sides and pivotally supporting the same to define the axis of rotation of said guide plate, said means for lockingly retaining said plate in an adjusted position comprising an arcuate slot in one flanged side of said guide plate disposed concentric to the axis of rotation of the guide plate, and a lock bolt extending through said slot and received in said bracket.

3. Apparatus for positioning an underwrap-sheet beneath material to be wrapped comprising horizontally disposed conveying means for transporting material to be wrapped along a predetermined path of travel from one station to another, means for supporting a continuous web material, web dispensing means for dispensing the continuous web of wrapping material from beneath said conveying means into transverse intersecting relation with respect to the path of travel of said conveying means, cutting means parallel to said web dispensng means to sever uniform lengths of said wrapping material, power means connected to said conveying means, means for operating said web dispensing and cutting means, sequence-timing means connected to and automatically operating said power means to operate said conveying means, web dispensing and cutting means in timed sequence, said conveying means comprising a pair of independently driven endless conveyors disposed in longitudinally spaced end-to-end relation with upper runs in substantially coplanar relation, and guide means interposed between said cutting means and said path of travel of said conveying means and directed toward adjacent ends of said two endless conveyors, said means for supporting said continuus web of wrapping material comprising coaxial bearings for removably supporting convoluted a roll of wrapping material, said means for dispensing said web comprising a power driven web-feed roller disposed in parallel, spaced relation from said co-axial bearings for receiving said continuous web thereover, a pair of gravity-responsive support arms journaled on the axis of rotation of said web-feed roller and supporting a transverse roll-driven roller thereon for peripherally engaging the convoluted roll of wrapping material, means simultaneously driving said web-feed roller and roll-driven rollers, and a gravity responsive idler roller engageable on the upper surface of said web feed roller to insure positive driving of the continuous web toward said cutter means.

4. Apparatus for positioning an underwrap-sheet beneath material to be wrapped comprising horizontally disposed conveying means for transporting material to be wrapped along a predetemined path of travel from one station to another, means for supporting a continuous web of material, web dispensing means for dispensing the continuous web of wrapping material from beneath said conveying means to into transverse intersecting relation with respect to the path of travel of said conveying means, cutting means parallel to said web dispensing means to sever uniform lengths of said wrapping material, power means connected to said conveying means, means for operating said web dispensing and cutting means, sequence-timing means connected to and automatically operating said power means to operate said conveying, web dispensing and cutting means in timed sequence, said conveying means comprising a pair of independently driven endless conveyors disposed in longitudinally spaced end-to-end relation with upper runs in substantially coplanar relation, and guide means interposed between said cutting means and said path of travel of said conveyor means and directed toward adjacent ends of said two endless conveyors, said power means comprising electrically operated power means for each of said conveyors, cutting means and means for dispensing said web, said sequence timing means comprising control circuits for said electrically operated power means, said control circuits including a first control circuit for operating one of said endless conveyors receiving thereon material with an underwrap sheet disposed therebeneath, a second circuit including means periodically operating the power means of said other endless conveyor to move material toward said one conveyor, a third circuit including means periodically operating the power means of said cutting for severing sheets of underwrap material, and a fourth circuit including means periodically operating the power means of said web dispensing means for feeding the leading end of a continuous web between said endless conveyors, and means periodically deactivating said second, third and fourth circuits until manually re-energized.

References Cited in the file of this patent

UNITED STATES PATENTS

| | | |
|---|---|---|
| 2,636,654 | Sykes | Apr. 28, 1953 |
| 2,803,930 | Schmidt | Aug. 27, 1957 |
| 2,816,408 | Powers | Dec. 17, 1957 |
| 2,860,462 | Sykes | Nov. 18, 1958 |
| 2,879,636 | Zuercher | Mar. 31, 1959 |
| 2,882,659 | Daniels | Apr. 21, 1959 |